Nov. 22, 1932.  E. E. WHITE  1,888,580
COUPLING FOR TIRE INFLATING MACHINES
Filed Aug. 6, 1930  4 Sheets-Sheet 1
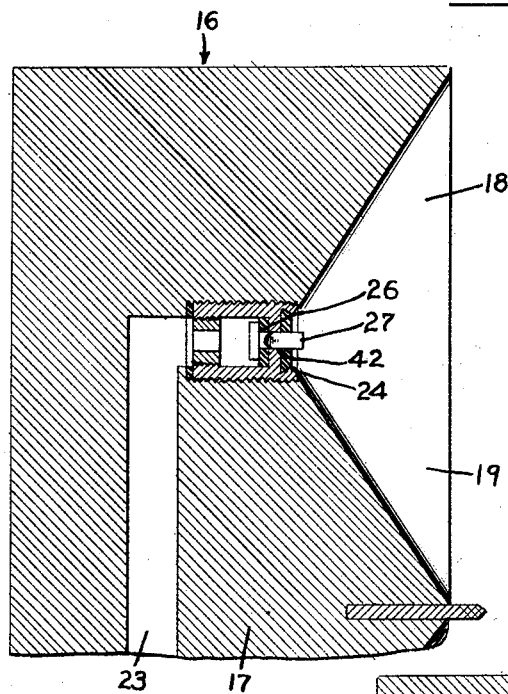
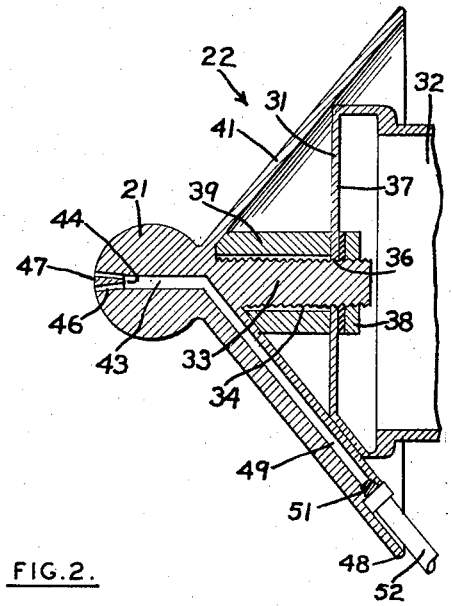
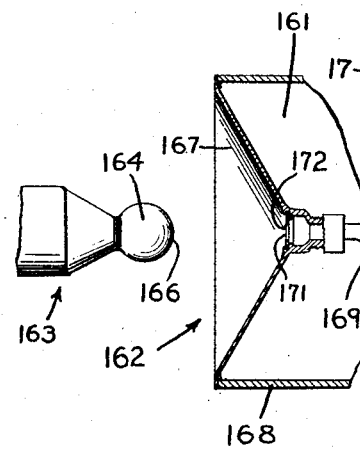
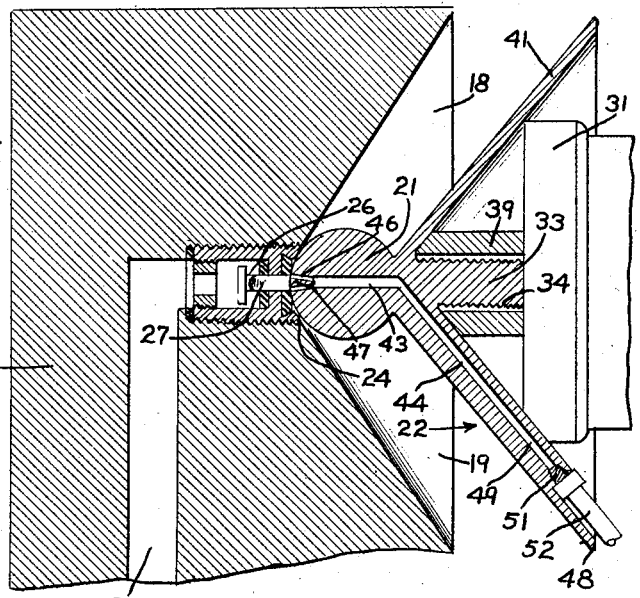
INVENTOR
E. E. WHITE
BY Hazard and Miller
ATTORNEYS

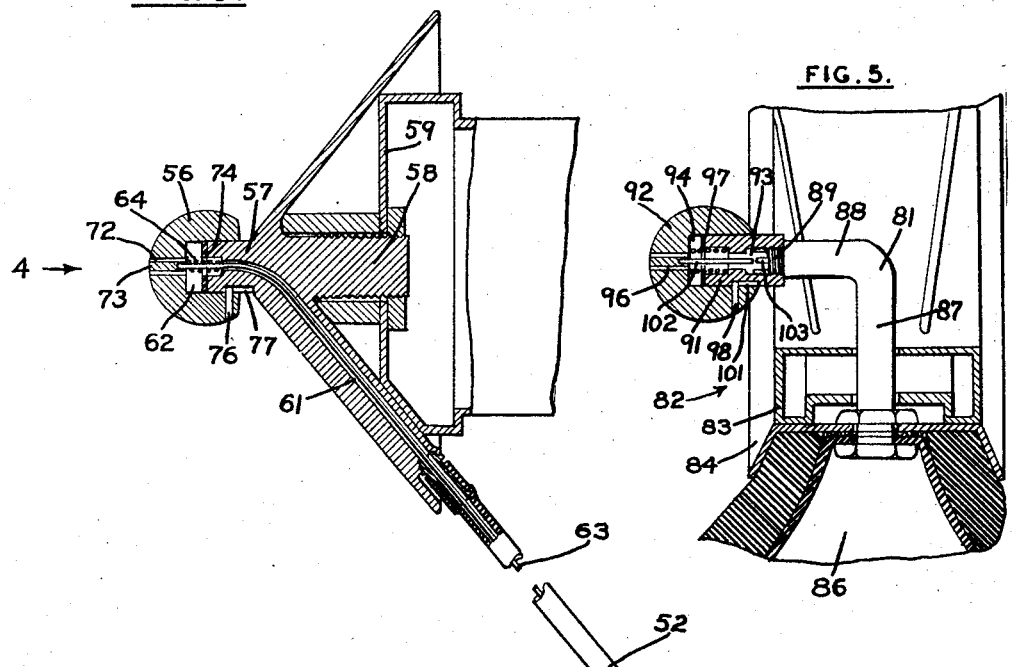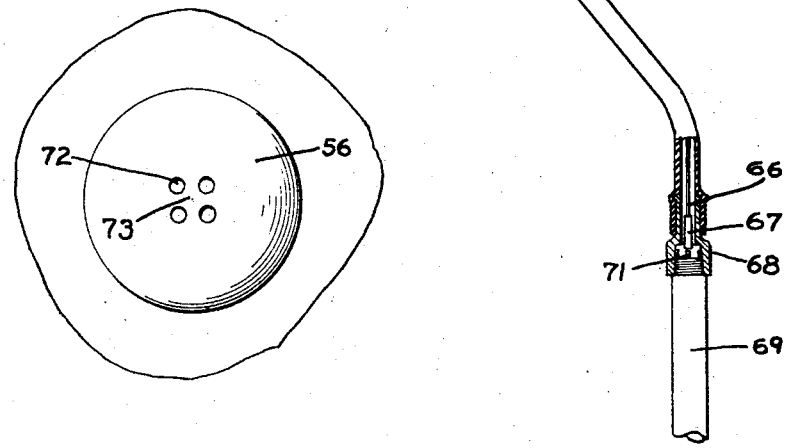

Nov. 22, 1932.  E. E. WHITE  1,888,580
COUPLING FOR TIRE INFLATING MACHINES
Filed Aug. 6, 1930   4 Sheets-Sheet 3
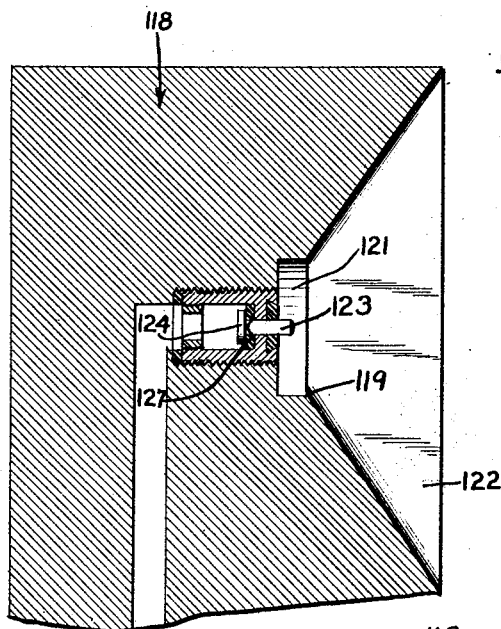
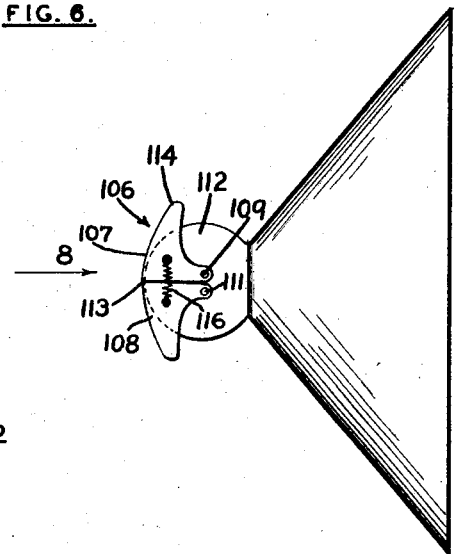
FIG. 6.
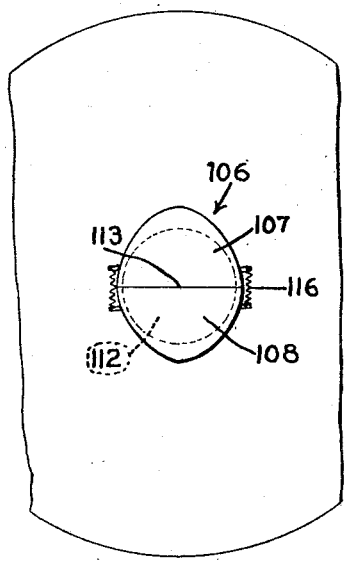
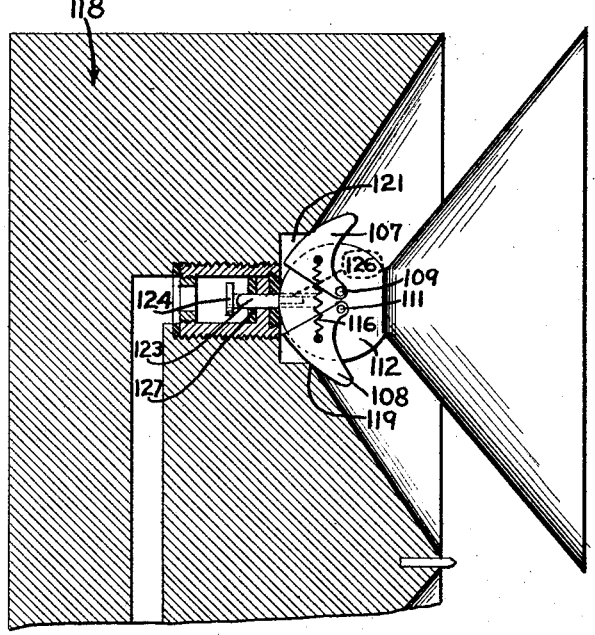
FIG. 7.
FIG. 8.
INVENTOR
E. E. WHITE
BY Hazard and Miller
ATTORNEYS Nov. 22, 1932.　　　　E. E. WHITE　　　　1,888,580
COUPLING FOR TIRE INFLATING MACHINES
Filed Aug. 6, 1930　　　4 Sheets-Sheet 4
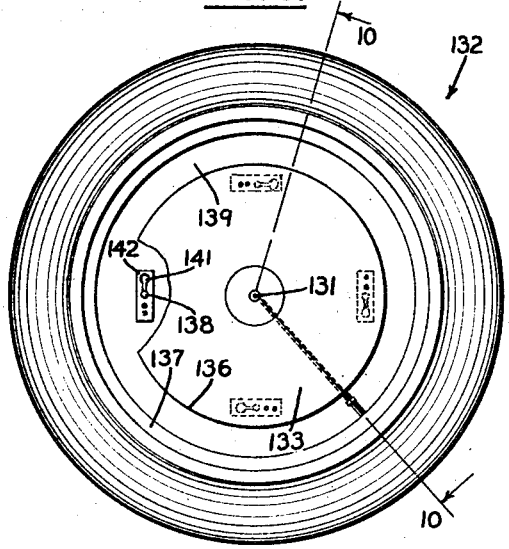
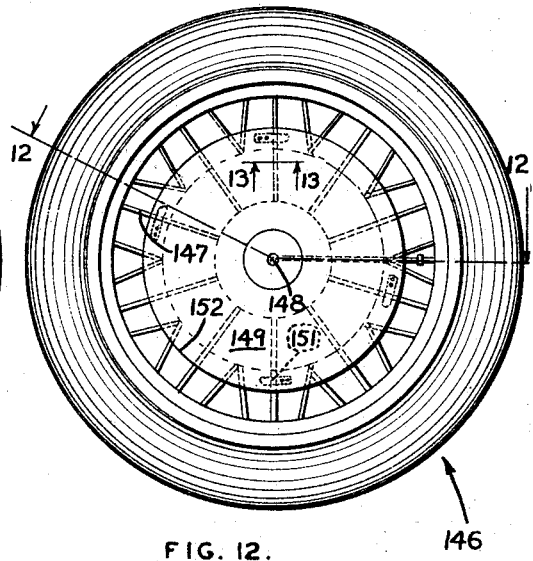
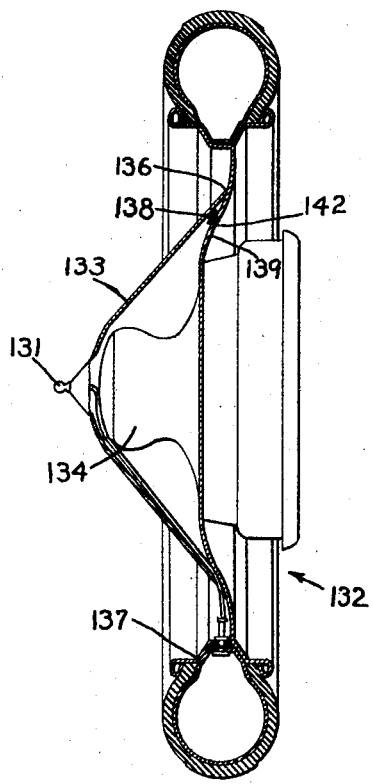
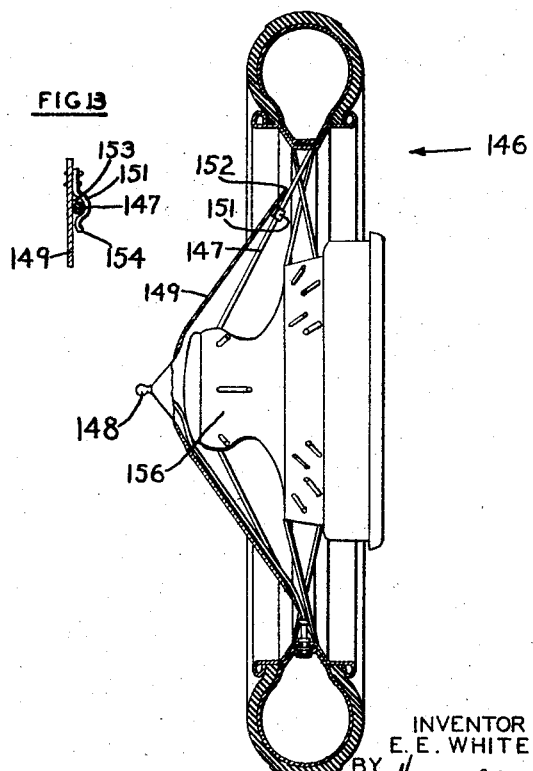
INVENTOR
E. E. WHITE
BY
ATTORNEYS Patented Nov. 22, 1932

1,888,580

UNITED STATES PATENT OFFICE

ELLIS EDMOND WHITE, OF HOLLYWOOD, CALIFORNIA, ASSIGNOR TO PNEUMATIC TIRE INFLATING DEVICES CORPORATION, OF LOS ANGELES, CALIFORNIA, A CORPORATION OF CALIFORNIA

COUPLING FOR TIRE INFLATING MACHINES

Application filed August 6, 1930. Serial No. 473,389.

This invention relates to coupling devices, and has for an object the provision of a novel coupling device whereby a supply of fluid under pressure, such as compressed air, may expeditiously be connected to a pneumatic tire mounted upon the wheel of a vehicle, for the purpose of inflation of the tire.

Another object is the provision of a coupling device as described, which is designed primarily for use in conjunction with the automatic tire inflating machine which comprises the subject matter of my copending application, Serial No. 484,419 filed September 25, 1930. It should be understood however, that the coupling device of the present invention, is also capable of affording convenience in inflating a pneumatic tire by other means, such for example, as the conventional supply hose having a valve in the outlet end thereof, which is adapted to be unseated when the outlet end is pressed by hand against the coupling device of the present invention, thereby permitting air to flow from the supply hose into the coupling device and thence to the tire.

Another object is to provide a coupling device of the character indicated hereinabove, which is of an exceedingly simple nature and which consequently, is relatively inexpensive to manufacture and install, and yet which is of a highly ornamental appearance and of such design that it lends itself well to the ornamentation of automotive vehicles of present-day design.

The invention possesses other objects and advantageous features, some of which, with those enumerated, will be set forth in the following description of the invention's particular embodiments which are illustrated in the drawings accompanying and forming a part of the specification.

Referring to the drawings:

Figure 1 is a vertical, medial sectional view taken through a coupling device of the present invention and a socket member adapted to cooperate with the coupling device for the purpose of supplying fluid under pressure thereto.

Fig. 2 is a view similar to Fig. 1, but shows the coupling device and the socket member in engagement with each other.

Fig. 3 is a vertical sectional view of a modified form of coupling device. This view shows the manner of connecting the coupling device to the valve tube of a pneumatic tire, portions of the connecting conduit being broken away to reduce the size of the figure.

Fig. 4 is a side elevational view of the coupling device, the direction of view being indicated by the arrow 4 of Fig. 3.

Fig. 5 is a vertical sectional view of a still further modified form of coupling.

Fig. 6 is a view similar to Fig. 1, but showing a slightly modified form of coupling device and socket member, the coupling device being provided with a dust cover.

Fig. 7 is a view similar to Fig. 6, but showing the coupling device and socket member in engagement with each other.

Fig. 8 is a side elevation view of the coupling device of Fig. 6, the direction of view being indicated by the arrow 8 of that figure.

Fig. 9 is a side elevation of an automobile wheel of the disc type, with another modified form of coupling device mounted in operative position thereupon.

Fig. 10 is a compound sectional view, the planes of section being indicated by the lines 10—10 of Fig. 9, and the direction of view by the arrows.

Fig. 11 is a side elevation of an automobile wheel of the wire spoke type, showing still another modified form of coupling device mounted in operative position thereupon.

Fig. 12 is a compound sectional view, the planes of section being indicated by the lines 12—12 of Fig. 11 and the direction of view by the arrows.

Fig. 13 is an enlarged detail view in vertical section, showing the manner of mounting the coupling device of Figs. 11 and 12 upon the wheel. The plane of section may be assumed to have been taken upon the line 13—13 of Fig. 11 with the direction of view indicated by the arrows.

Fig. 14 is a vertical, medial sectional view of still another modified form of coupling, this view being broken away to reduce its size.

The coupling device of the present invention has been produced with the object in view of expediting the process of inflating one or more of the pneumatic tires of an automobile or other vehicle. This object has been attained partially as a result of the improved design of the quickly attachable and detachable coupling device itself, and partially as a result of the positioning of the coupling device coaxially with respect to the wheel with which it is associated. This is true whether the coupling device is used in conjunction with the automatic tire inflating machine of my aforesaid copending application, or whether the connection between the supply of compressed air and the coupling device is effected by hand. In the case of the automatic inflating machine, positioning of the coupling device on the wheel at the axis of revolution thereof, reduces to relatively close limits the possible variation in elevation of the coupling device for all sizes of automobile wheels, as compared to the conventional positioning of the valve tube of a pneumatic tire with which connection must be made in order to effect inflation of the tire. Consequently, the size and/or number of female coupling members used on my automatic inflating machine, may be materially reduced by positioning the male coupling member which comprises the present invention, at the axis of revolution of the wheel. In the case of the source of compressed air which must be engaged with the coupling member by hand, convenience is afforded by positioning the male coupling member at the axis of revolution of the wheel, because when so arranged the operator knows instantly, the exact position of the coupling member, whereas in the case of the conventional construction wherein the coupling member is at or closely adjacent the rim of the wheel, the operator must search for the valve tube with which connection must be made in order to effect inflation of the tire.

Figs. 1 and 2 show one form of the male coupling member of the present invention, and also one of the female coupling members which is here included merely for the purpose of facilitating explanation of the construction and operation of the male coupling member, the principles of construction and operation of the female coupling member, comprising a portion of the subject matter of my aforesaid copending application. It will suffice for the purpose of the present disclosure, to explain that the female coupling member 16 comprises a block 17 having a concave outer face 18 providing a recess 19 within which the head 21 of the male coupling member 22 is adapted to be received. A passageway 23 which is adapted to be connected in any convenient manner to a supply of fluid under pressure, such as compressed air, leads to the bottom or apex 24 of the recess 19. A valve 26 is adapted to seat and prevent flow of air from the passageway 23 except when the stem 27 of the valve 26, which extends into the recess 19, is pressed inwards to unseat the valve.

The male coupling member 22 is designed to be mounted upon the hub cap 31 of a conventional automobile wheel, the hub of which is indicated at 32. For this purpose the head 21 of the coupling member 22 is mounted rigidly and preferably integrally upon a spindle 33 which is provided with threads 34. The spindle 33 is intended to be extended through a suitable aperture 36 formed centrally in the outer end 37 of the hub cap 31, so as to permit a nut 38 to be tightened upon the spindle 33 against the inside of the end 37, so as to compress the end 37 between the nut 38 and a sleeve 39 which is preferably loosely mounted upon the spindle 33. The outer end of the sleeve 39 engages a suitable shoulder to limit inward movement of the spindle 33 through the sleeve 39. In the present modification, this shoulder is in the form of a protective cone 41 which is also rigid and preferably integral with the spindle 33 and head 21. The cone 41 flares radially outwards and toward the hub cap 31, and preferably is of such dimension that it extends past the hub cap 31 so as to effectually conceal it. I prefer to provide a suitable finish on the exterior surface of the head 21 and cone 41, such as chromium plating or suitable enamel, so that the resultant structure is of a highly ornamental appearance.

The head 21, which is spherical, is disposed coaxially with respect to the spindle 33, which, as explained hereinabove, is mounted centrally with respect to the hub cap 31. In view then, of the fact that the hub cap 31 is disposed coaxially with respect to the wheel with which it is associated, the axis of revolution of that wheel will coincide with the horizontal axis of the spherical head 21.

Owing to the concavity of the outer face 18 of the female socket member 16, whenever the head 21 is engaged by any portion of the face 18 and the female coupling member 16 then pressed toward the male coupling member 22, the motion of the female member 16, will be guided so as to seat the head 21 at the apex 24 of the recess 19 as illustrated upon Fig. 2. This will cause the head 21 to engage the stem 27 of the valve 26, and move the valve 26 inwards away from its seat, so as to permit air to flow from the passageway 23 through the hole 42 within which the stem 27 is reciprocable, it being understood that the valve stem 27 is flattened on one or more sides so as to permit such flow of air. The head 21 is provided with an aperture 43 therethrough, the outer end 44 of which is divided into a plurality of apertures 46 spaced about a central solid portion 47. The purpose of this solid portion 47 is to engage the valve stem 27 when the spherical head 21 seats within the apex 24 of the recess 19. The apertures 46 are sufficiently close together however, to permit all of them to come into register with the hole 42 within which the valve stem 27 is mounted, and through which air from the passageway 23 passes so that when the head 21 engages the extreme bottom of the recess 19, the air from the passageway 23 will enter the aperture 43. This aperture 43 extends inwards from the head 21 and preferably along a side of the cone 41 to a position closely adjacent the peripheral edge 48 thereof. Here the end of the passageway 49 which communicates with the aperture 43, is provided with internal threads 51, the purpose being to permit the attachment of a conventional rubber hose or an equivalent conduit 52, this conduit being of sufficient length to permit its other end to be attached to the valve tube of the associated pneumatic tire which, as will readily be understood, is mounted in the conventional manner, upon the rim of the wheel with which the hub 32 is associated. The manner of connecting the outer end of the hose 52 to the valve tube, is illustrated clearly upon Fig. 3.

Escape of air from the pneumatic tire, is prevented through the expedient of the conventional valve (not shown) mounted in the usual manner in the valve tube. Such valves are adapted to be unseated when sufficient fluid pressure is exerted thereagainst in a direction toward the tire. Consequently, when air under pressure sufficiently greater than the pressure within the tire, is supplied to the aperture 43, passageway 49 and hose 52 as a result of the engagement of the head 21 within the apex of the recess 19, the valve will be unseated, permitting air to flow into the tire to increase the pressure therein. As soon as the engagement between the head 21 and the female coupling member 16 is broken, the tire valve will again be seated so as to retain within the tire, all the air which has been supplied thereto.

However, in view of the fact that it might be advisable under certain circumstances of installation, to provide means for mechanically unseating the valve, the modifications of the male coupling illustrated upon Figs. 3, 4 and 5, have been provided. Fig. 3 shows the spherical head 56 slidably mounted upon an extension 57 of the spindle 58 whereby the coupling member is mounted upon the hub cap 59. The passageway 61 whereby air is fed to the hose 52, terminates at the outer end of the extension 57 within the bore 62 of the head 56, within which the extension 57 of the spindle 58 is slidably received. A longitudinally rigid but laterally flexible cable such as a length of piano wire 63, extends through the hose 52 and passageway 61 and engages the head 56 preferably by being threaded thereto. A coil spring 64 is under compression between the head 56 and the outer end of the extension 57, urging the head 56 to its outer extreme of motion. The other end 66 of the wire 63, is provided with a plunger 67 which is slidably disposed within a cap or ferrule 68 whereby the outer end of the hose 52 is connected to the valve tube 69. The cap 68 is preferably threaded to the tube 69 so as to permit disengagement of the hose 52 from the tube 69 when desired. The plunger 67 is so positioned, and the wire 63 is of such length that when the head 56 is slid inwards upon the extension 57 of the spindle 58 (i. e., to the right as viewed upon Fig. 3) the plunger 67 will be pressed radially outwards of the wheel so as to engage and depress the stem 71 of the tire valve.

This arrangement does away with the necessity of utilizing part of the pressure of the air supplied at the head 56 for the purpose of unseating the valve. If engagement between the male and female coupling members is to be continued until no more air will flow from the female coupling member to the tire, the tire valve will be seated by means of its spring (not shown) slightly before the pressure within the tire is equal to the pressure within the female coupling, unless means are provided for mechanically holding the valve unseated until disengagement between the male and female coupling member is effected. Obviously, the provision of the wire 63 as hereinabove described, will result in holding the tire valve open until the female coupling is withdrawn from the male coupling.

A plurality of relatively small apertures 72 spaced about a central solid portion 73, provide the means of ingress of the air from the female coupling member to the bore 62, the central portion 73 serving to depress the valve 27 of the female member. Preferably a gasket 74 is provided upon the end of the extension 57, to be engaged by the bottom of the bore 62 of the head 56 when the head is fully depressed, so as to prevent escape of air between the head 56 and the extension 57. Outward movement of the head 56 upon the extension 57, is limited by means of a pin 76 rigid with the head 56 and slidably disposed within a longitudinally extending groove 77 in one side of the extension 57. The engagement of the pin 76 within the groove 77, will also prevent rotation of the head 56 upon the extension 57, thus precluding the possibility of the head's becoming unthreaded from the wire 63.

Fig. 5 shows another modified form of male coupling member which dispenses with the protective cone, and which is adapted to be applied directly to the conventional offset or angular valve tube 81. This modification of the male coupling member is not intended to be disposed coaxially with respect to the wheel 82, but instead, is mounted adjacent the felly 83 upon which the rim 84 and tire 86 are mounted. The valve tube 81 has a portion 87 extending radially inwards with respect to the wheel 83, and an angular portion 88 which extends laterally. The outer end 89 of the angular portion 88, is threaded to receive the conventional valve cap.

The spindle 91, which supports the spherical head 92 of this modification of the male coupling member, is provided with a passageway 93 which is interiorly threaded to permit mounting the spindle 91 upon the threaded end 89 of the valve tube 81. The passageway 93 extends throughout the entire length of the spindle 91, so that it opens at its outer end into the bore 94 of the spherical head 92 which is slidably mounted upon the spindle 91. Relatively small spaced apertures 96 through the head 92, communicate with the bore 94 thereof, so that air from the female coupling member may be conducted to the bore 94 and passageway 93, and thence to the valve tube 81 and tire 86. A coil spring 97 under compression between the head 92 and the outer end of the spindle 91, urges the head 92 to its outer extreme of movement, a pin 98 rigid with the head 92 and slidable within a groove 101 in the spindle 91, serving to limit this outward movement. A relatively short length of piano wire 102 is attached to the head 92 and extends through the passageway 93, into position to engage the stem 103 of the tire valve when the head 92 is depressed, so that this modification of the coupling member operates in substantially the same manner as that of Fig. 3.

The modification illustrated upon Figs. 6, 7, and 8, is similar in all respects to those previously described, with the exception that it is provided with a suitable dust cover 106 whereby dust, mud and the like, are prevented from entering the apertures through which air flows on its way to the tire. This modification may be provided with the means for mechanically unseating the tire valve in accordance with the showing of Fig. 3, or it may rely upon the pressure of the air supplied thereto, to unseat the valve, under which circumstances, it will be similar to that shown upon Fig. 1. A pair of plates 107 and 108, each of which is of substantially spherical configuration, are pivoted as by pins 109 and 111 respectively, to the head 112 for movement about slightly spaced axes extending transversely of the head. The curvature of each of the plates 107, 108, is of slightly greater radius than that of the spherical head 112, so that whereas the edges 113 of the two plates which are proximal to each other, are disposed closely adjacent the surface of the head 112, the outer edges 114 of the plates, are materially spaced therefrom. A coil spring 116 is under tension between the two plates 107 and 108, so as to urge the edges 113 thereof, into engagement with each other.

The female coupling member 118, intended to be used in conjunction with this modification of male coupling member, is provided with an annular shoulder 119 slightly spaced from the apex 121 of the recess 122 therein, this shoulder being of such size that it engages both plates 107 and 108 at points spaced from the edges 113 thereof. Inasmuch as the distance between the two points of engagement of the shoulder 119 with the plates 107 and 108, is materially greater than the distance between the axes of the pins 109 and 111, this engagement of the shoulder 119 with the plates, will cause the plates to be swung apart about their respective pins 109 and 111, to substantially the positions indicated on Fig. 7, thus exposing the outer surface of the spherical head 112 to permit engagement therewith with the stem 123 of the valve 124 and to permit registration of the apertures 126 of the head 112 with the port 127, whereby air is conducted from the female coupling member to the head 112. As soon as the female member 118 is withdrawn, the spring 116 will draw the plates 107 and 108 together, thus effectually covering that portion of the head 112 which makes engagement with the female coupling member 118, with the result that this portion of the head is protected from dust, mud and other substances, apt to interfere with the normal operation of the device.

Figs. 9 and 10 show a modified method of attaching the male coupling member to a wheel. Figs. 9 and 10 show the spherical head 131 of the coupling member, mounted coaxially with respect to the wheel 132 and extending laterally therefrom, as in the case of the previously described modifications, with the exception of that of Fig. 5. Instead of being mounted upon the hub however, the protective cone 133 is materially increased in size, so that it substantially conceals the hub 134 of the wheel 132. In fact, the peripheral edge 136 of the cone 133, is only slightly smaller than the inside diameter of the felly 137. A plurality of headed pins 138 extend outwards from the disc 139 of the wheel 132, these pins being angularly spaced at preferably regular intervals. Each of the pins 138 is adapted to be engaged within a keyhole slot 141 which is formed in a plate 142 riveted or otherwise firmly attached to the inside surface of the cone 133, the number of plates 142 corresponding to the number of pins 138. The cone 133 and its spherical head 131 are mounted in operative position by slipping the heads of the pins 138 through the larger ends of the slots 141 and then turning the cone 133 so as to position the pins 138 in the smaller ends of their respective slots. Each of the plates 142 is slightly offset from the interior surface of the cone 133 to accommodate the head of the associated pin 138 between the plate and the cone. Preferably one or more of the plates 142 is offset sufficiently so that when the associated pin 138 is seated within the smaller end of the keyhole slot 141, the outer end of the plate will press firmly against the disc 139 of the wheel 132 and thus releasably retain the cone 133 in position.

Figs. 11 to 13 inclusive, disclose a method of mounting the coupling member upon a wheel 146 having wire spokes 147. This modification of coupling 148 and cone 149, is similar to that of Figs. 9 and 10, but instead of being provided with plates on the inner surface of the cone 149, a plurality of spring clips 151 are firmly secured to the inner surface of the cone 149 preferably adjacent the peripheral edge 152 thereof. Each clip 151 is bent outwards from the plane of the cone 149 adjacent the point of attachment of the clip thereto, and then back to a position closely adjacent the cone 149, so as to define a space 153 adapted to receive one of the spokes 147. The extreme end 154 of the clip 151, is bent outwards again, to provide an inclined surface adapted to engage the spoke 147 when the cone is rotated with respect to the wheel, causing the spoke to wedge the end 154 of the clip 151 away from the surface of the cone, to permit the spoke to enter the space 153. As a result, the cone 149 and its coupling 148, may be substantially instantaneously mounted in operative position upon a wire wheel 146, simply by placing the cone in position over the hub 156, with each of the spring clips 151 disposed between two adjacent spokes 147, and then turning the cone until each clip engages and snaps around one of the spokes.

The modification illustrated upon Fig. 14, shows the coupling modified to the extent that the hub 161 carries the female portion 162 of the coupling, while the cooperative male portion 163 of the coupling, is the part associated with the supply of air under pressure, and is provided with a spheroidal head 164 having ports 166 therethrough. The female coupling member 162 is formed by providing a depression 167 in the outer face of the hub cap 168, and connecting the conduit 169 which leads to the valve tube (not shown) to a port 171 at the apex of the depression 167. A gasket 172 encircling the port 171, is adapted to establish sealing engagement with the head 164 around its ports 166, when the head seats at the apex of the depression 167, and thus prevent leakage while air is passing through the ports 166 into the passageway 173 with which the conduit 169 communicates. This form of coupling may be considered preferable at least from the standpoint that it eliminates the projecting head from the hub cap of the wheel, which, in the other modifications, is more or less subject to being damaged through striking objects such as a curb or the hub of another automobile.

It is to be understood that the details of the invention as herein disclosed, are subject to alteration within the spirit or scope of the appended claims.

I claim:

1. A device for connecting a supply of fluid under pressure to a pneumatic tire mounted upon a journalled wheel; comprising a spindle, means for mounting said spindle coaxially upon said wheel to extend laterally therefrom, a spherical head on said spindle having an aperture therethrough, a tube communicating with the interior of said tire and with the aperture through said head, and a dust cover removably mounted on said head over said aperture.

2. A device for connecting a supply of fluid under pressure to a pneumatic tire mounted upon a journalled wheel; comprising a spindle, means for mounting said spindle coaxially upon said wheel to extend laterally therefrom, a spherical head on said spindle having an aperture therethrough, a tube communicating with the interior of said tire and with the aperture through said head, a dust cover removably mounted on said head over said aperture, and means operative upon engagement of said connecting device with said fluid supply for withdrawing said dust cover from said aperture.

In testimony whereof I have signed my name to this specification.

ELLIS EDMOND WHITE.